(12) United States Patent
Matich

(10) Patent No.: US 10,947,422 B1
(45) Date of Patent: Mar. 16, 2021

(54) HOLDER

(71) Applicant: Ronald D. Matich, Baxter, MN (US)

(72) Inventor: Ronald D. Matich, Baxter, MN (US)

( * ) Notice: Subject to any disclaimer, the term of this patent is extended or adjusted under 35 U.S.C. 154(b) by 14 days.

(21) Appl. No.: 16/362,583

(22) Filed: Mar. 22, 2019

Related U.S. Application Data

(60) Provisional application No. 62/647,673, filed on Mar. 24, 2018.

(51) Int. Cl.
| | |
|---|---|
| *C09J 7/38* | (2018.01) |
| *C09J 7/29* | (2018.01) |
| *B32B 7/12* | (2006.01) |
| *B32B 27/30* | (2006.01) |
| *A01K 97/06* | (2006.01) |
| *A47G 29/08* | (2006.01) |
| *C09J 7/40* | (2018.01) |

(52) U.S. Cl.
CPC . *C09J 7/38* (2018.01); *C09J 7/29* (2018.01); *A01K 97/06* (2013.01); *A47G 29/08* (2013.01); *B32B 7/12* (2013.01); *B32B 27/30* (2013.01); *B32B 2307/4023* (2013.01); *B32B 2405/00* (2013.01); *C09J 7/40* (2018.01); *Y10T 428/14* (2015.01)

(58) Field of Classification Search
CPC . C09J 7/38; C09J 7/29; C09J 2201/128; C09J 2201/134; A01K 97/06; A47G 29/08; B32B 7/12; B32B 27/30; B32B 2307/4023; B32B 2405/00; Y10T 428/14
See application file for complete search history.

(56) References Cited

U.S. PATENT DOCUMENTS

| | | | | |
|---|---|---|---|---|
| 3,503,835 | A * | 3/1970 | Werner | B42F 5/02 428/42.2 |
| 3,952,133 | A * | 4/1976 | Amos | C09J 7/26 428/354 |
| 5,342,665 | A * | 8/1994 | Krawitz | B44C 1/105 40/600 |
| 6,001,471 | A * | 12/1999 | Bries | A47G 1/175 428/343 |
| 6,403,189 | B1 * | 6/2002 | Donahue | B42F 15/066 24/67 AR |
| 6,482,487 | B1 * | 11/2002 | Donahue | B42D 5/003 24/67 AR |
| 6,649,239 | B2 * | 11/2003 | Donahue | B42D 5/003 428/40.1 |
| 9,611,407 | B1 * | 4/2017 | Heuer | C09J 7/29 |
| 2004/0081788 | A1 * | 4/2004 | Sudofsky | C09J 7/22 428/40.1 |
| 2004/0166272 | A1 * | 8/2004 | Beyer | G09F 15/00 428/40.1 |
| 2012/0183714 | A1 * | 7/2012 | Peng | C09J 7/38 428/41.8 |

* cited by examiner

*Primary Examiner* — Patricia L. Nordmeyer

(57) ABSTRACT

A flexible holder for fish hooks or other items on boats, for jewelry or other items in dressing rooms, or for any small items anywhere the flexible holder can be engaged. The flexible holder has, in order, a rear release layer, a pressure sensitive rear layer, a substrate layer, a laminating adhesive layer, a layer of plastic or vinyl, a pressure sensitive adhesive front layer, and a front release layer.

6 Claims, 2 Drawing Sheets

HOLDER

This application claims the benefit under 35 U.S.C. 119(e) of the U.S. provisional application No. 62/647,673 filed Mar. 24, 2018, which provisional application is hereby incorporated by reference in its entirety into this application.

FIELD OF THE INVENTION

The present invention relates to a holder having two layers of a pressure sensitive adhesive, where a rear layer of a pressure sensitive adhesive may be stuck to a vertical, horizontal, or oblique surface, where a front layer of a pressure sensitive adhesive may receive an item such as a fishing lure or pair of earrings, and where a middle layer may have a color photograph, printed information, or advertising.

BACKGROUND OF THE INVENTION

A jewelry box or tackle box is a two handed box in several ways. First, such a box may take two hands to open, one hand to keep the box from moving and the other hand to operate the latch. Second, once the box has been opened, the user will find jewelry and fishing lures that are more often than not stuck together or tangled up to such a degree that it takes two hands to remove the desired item.

SUMMARY OF THE INVENTION

A feature of the present invention is the provision in a flexible holder, of a release first layer, of a pressure sensitive second layer, the pressure sensitive second layer being directly on the release first layer, of a substrate third layer, the substrate third layer being directly on the pressure sensitive second layer, of a laminating adhesive fourth layer, the laminating adhesive fourth layer being directly on the substrate third layer, of a fifth layer formed of one of plastic or vinyl, the fifth layer being directly on the laminating adhesive fourth layer, of a pressure sensitive adhesive sixth layer, the pressure sensitive adhesive sixth layer being directly on the fifth layer, and of a release seventh layer, the release seventh layer being directly on the pressure sensitive adhesive sixth layer. Another feature of the present invention is the provision in a flexible holder, of the substrate third layer being a photograph.

Another feature of the present invention is the provision in a flexible holder, of the substrate third layer including an image.

Another feature of the present invention is the provision in a flexible holder, of the substrate third layer including indicia.

Another feature of the present invention is the provision in a flexible holder, of the substrate third layer having printed information.

Another feature of the present invention is the provision in a flexible holder, of each of the fourth, fifth, sixth, and seventh layers being clear or transparent such that any information found on the third layer is visible to the human eye.

Another feature of the present invention is the provision in a flexible holder, of the substrate having at least one of a pictorial or written instruction relating to an item that may be held by one of the pressure sensitive adhesive second and sixth layers.

An advantage of the present invention is that the present holder is inexpensive to manufacture.

Another advantage of the present invention is that it is simple to use.

Another advantage of the present invention is that the holder may engage and hold light or heavy objects.

Another advantage of the present invention is that merely one hand may be used to stick items to the holder or take items off the holder.

DETAILED DESCRIPTION

The present holder can be stuck or adhesively and removably engaged on a wall, anywhere on a boat, a car or a house. In a house it could be used or anchored by the rear pressure sensitive re-positional adhesive. With the re-positional adhesive it can be removed off of the wall and re-positioned multiple times. This same action can take place on surfaces, especially vertical surfaces, in a boat or a car or other vehicle.

With the front pressure sensitive removable re-positional adhesive, items can be applied and stored on the holder or organizer. Examples of household items are jewelry, measuring cups, measuring spoons, office supplies or any metal, plastic or glass. Paper items are desirably not engaged to the front face of the holder.

The holder allows one to have an organizer in any location applying almost any item. For example in the bathroom or dressing area, a woman can apply and remove jewelry to the holder (or catch-all) many times for convenience, instead of tossing an item in the tangled mess found in a jewelry box.

In a boat for instance, handy access can be had to fishing tackle and hooks that are applied and removed many times. Sunglasses can also be applied because there is no residue left behind when an item is unstuck or disengaged from the holder.

Another situation for the holder is when working on a vehicle. The mechanic can attach his tools and parts to the holder for easy access and organization while working. The mechanic can engage a tool to the holder with one hand and remove a tool with one hand. The holder is like an adhesive Velcro® for items.

The holder can also be used for advertising and promotions with the print or copy section (layer 3) of the holder (i.e., the Catch-All Organizer).

Figure 1A:
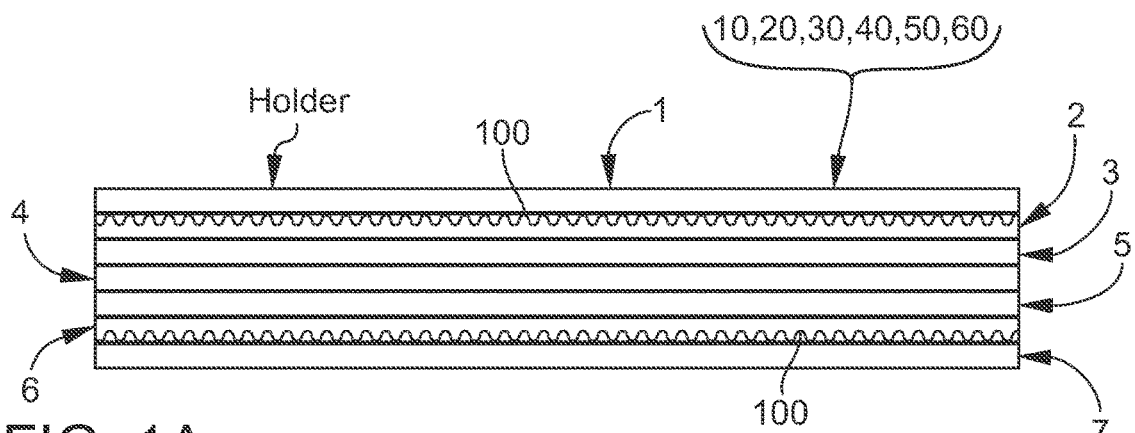
FIG. 1A is a diagrammatic section view of the holder of the present invention.

The holder includes layers, as shown in FIG. 1A.

Layer 1 is the rear layer or the rearmost layer. Layer 1 is a rear release liner that is paper or plastic. Layer 1 can be constructed with paper or plastic with a silicone or other release layers. Layer 1 is a flexible solid. The purpose of layer 1 is to protect the rear adhesive until one is ready to use the holder.

Layer 2 is a rear pressure sensitive repositional adhesive. This adhesive can have different levels of adhesion. Because of the highs and lows in the adhesive, the harder you push the more intense the stick. This layer is used as the anchoring base for the holder for holding the holder at any location, though this location preferably is not formed of paper or carpet.

Layer 3 is a substrate that can receive printing thereon. The purpose of this layer 3 is to communicate to the end user. This communication may take the form of advertising for a resort (please see FIG. 2) or may take the form of directions for using the holder or for using an item stuck to the holder. Layer 3 may be, for instance, paper or plastic. Layer 3 is a flexible solid. Layer 3 may be a picture or advertising information. Layer 3 may be, for instance, a 4 color print. Layer 3 can be paper, plastic, or vinyl. One definition of "substrate" is "a material which provides the surface on which something is deposited or inscribed."

Layer 4 is the permanent laminating adhesive. This lamination is applied to the print or copy found on the substrate of layer 3 for protection against the weather, sun, rain, dirt, wind, heat, and other elements. Layer 4 is the adhesive used to apply the clear protective picture material (layer 5) to the picture (layer 3) or advertising (layer 3).

Layer 5 is a clear plastic or vinyl. Layer 4 is adhesive stuck to the rear side of layer 5. Layer 5 is a laminating print or copy protector. Layer 5 is a flexible solid. Layer 5 is the lamination material itself, which is clear plastic or vinyl. Also, this copy protector of layer 5 is the adhesive carrier during manufacturing. Layer 5 is a clear protector to protect the picture or advertising information from the weather or environment that the Catch-All may endure. Also, during manufacturing a way is needed to apply the permanent adhesive (layer 4) and the front pressure sensitive repositional adhesive (layer 6) to the holder, and the clear protector material of layer 5 does this. There are two types of adhesive on the clear protector layer 5. The first adhesive on the rear side of layer 5 is layer 4. The second adhesive on the front side of layer 5 is layer 6, a pressure sensitive adhesive. Layer 5 can be referred to as an adhesive carrier.

Layer 6 is a front pressure sensitive re-positional adhesive. This location, i.e., layer 6, on the holder (i.e., Catch-All) is the area where items are applied and removed many times, such as tools, nuts, bolts, jewelry, etc. The waves in the pressure sensitive re-positional adhesive work as follows: the harder you push the item, the stronger the hold.

Layer 7 is the front clear release liner. This layer 7 is preferably plastic or vinyl. Layer 7 is a flexible solid. Layer 7, as well as layers 4, 5, and 6, is clear so you can read the advertising or print on layer 3 even if the holder is not being used, i.e., is not stuck to a vertical, horizontal, or oblique surface. Layer 7 also protects the front adhesive until the holder (i.e., the Catch-All) is ready to be used.

Figure 1B:
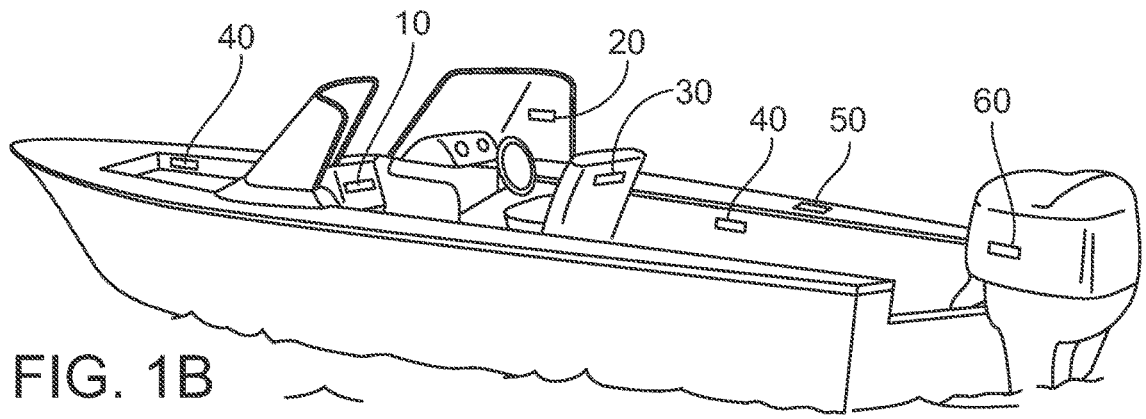
FIG. 1B is a perspective view of a boat showing various locations where the holder of the present invention can be engaged, with the rear face of the holder being engaged to vertical surfaces of the boat.
Figures 1C, 1D:
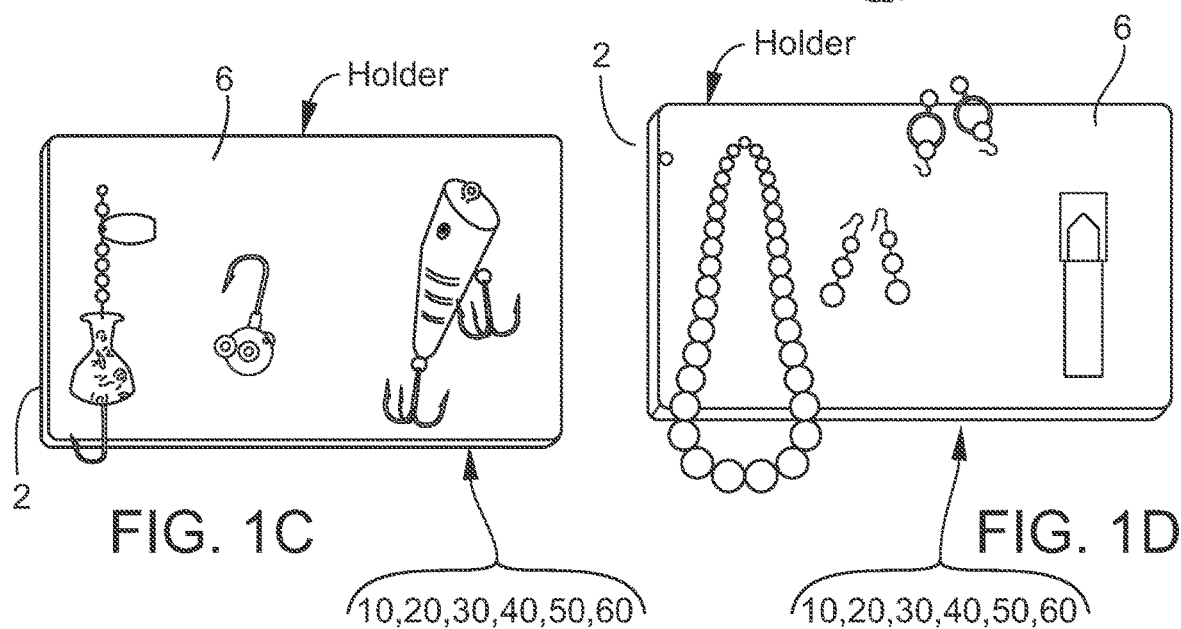
FIG. 1C is a perspective view of the holder showing fishing tackle being held on the vertical front surface of the holder.
FIG. 1D is a perspective view of the holder showing various items of jewelry held on the vertical front surface of the holder.

FIG. 1B shows certain locations where the holder may be applied to a boat: holder 10 is on the dash of the boat; holder 20 is on the windshield of the boat; holder 30 is on a seat of the boat; holder 40 is on the side of the interior of the boat; holder 50 is on the top rail edge of the boat; and holder 60 is on the motor of the boat. The holder can be applied to any horizontal, vertical, or oblique position on the boat, wherever the fisherman finds himself or herself on the boat, wherever the fisherman, pilot, passenger, swimmer, or water skier finds the location to be most convenient and accessible. FIG. 1C shows three different types of fishing lures engaged on the front face (layer 6) of the holder.

FIG. 1D shows, attached to the front face (layer 6) of the holder, a necklace, a first pair of earrings, a second pair of earrings, and a lipstick tube. The holder of the present invention can be placed in a woman's dressing area, bathroom, bedroom, or car.

Figure 2:
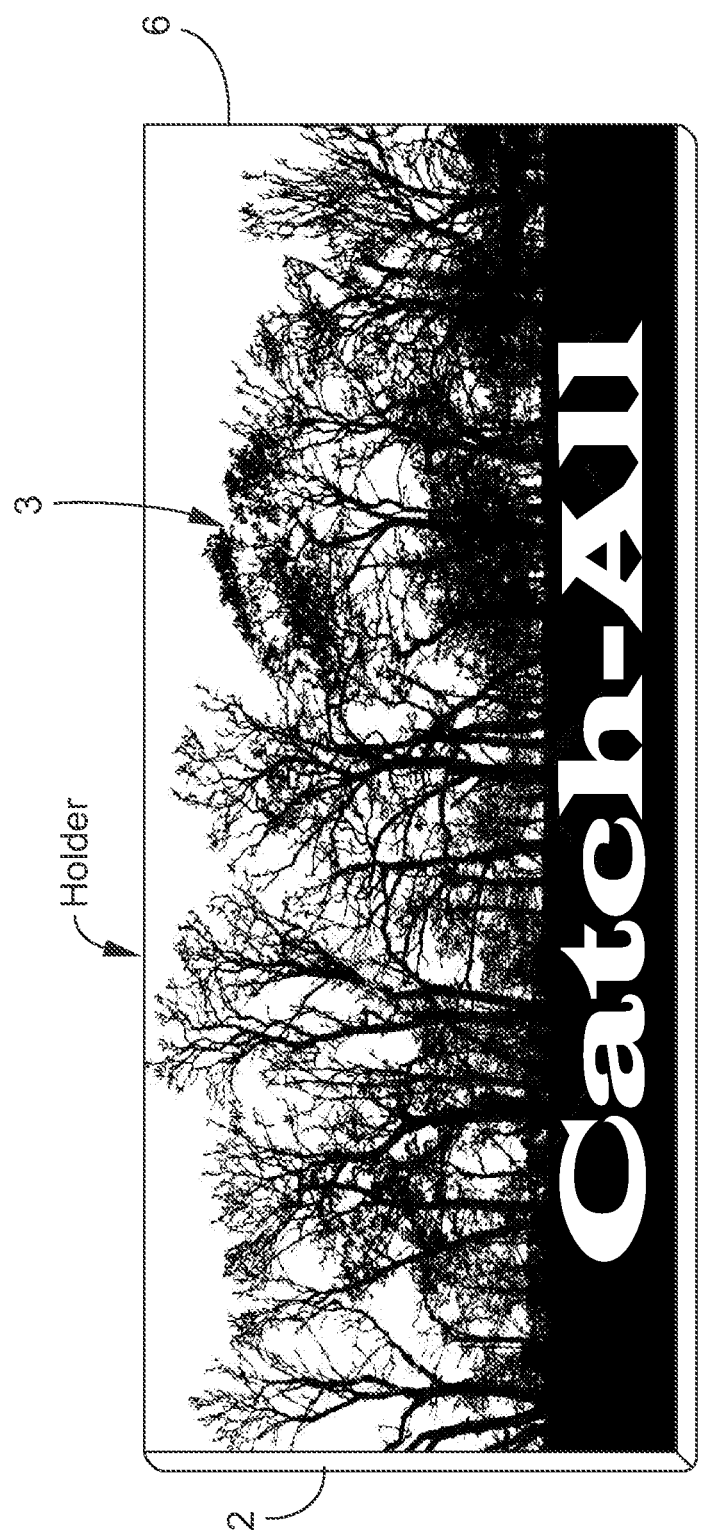
FIG. 2 is a perspective view of the holder.

FIG. 2 shows the holder having a picture as layer 3, where the picture is an advertisement for a resort.

It should be noted that the pressure sensitive adhesive of layers 2 and 6 is a series of waves 100 or peaks and valleys 100 so when one is sticking the pressure sensitive adhesive on something (layer 2 is being pressed on a surface) or an item onto the pressure sensitive adhesive (layer 6 is receiving an item pressed onto it), the pressure sensitive adhesive works as follows: the more pressure that is applied, the more adhesive surface area that is in use, thereby increasing the sticking or the sticking force such that, for example, even relatively heavy items can be engaged.

The thickness of the holder can be varied, as shown by the difference between FIG. 1C and FIG. 1D. The holder is flexible such that the holder can be applied to flat or curved surfaces without breaking any of the layers 2, 3, 4, 5, or 6 (or layer 7 before layer 7 is removed). The holder is resilient such that, if the holder is applied to a curved surface, the holder reverts to a flat or planar form when the holder is removed from such curved surface.

The holder, through layer 2, can be applied to a surface one time and re-applied many times. The holder, through layer 6, can receive and engage an item one time or multiple times.

In operation, layer 1 is removed. Then layer 2 is stuck to a flat or curved surface or irregular shaped surface, which surface may be vertical, horizontal, or oblique (i.e., between horizontal and vertical). Then hand pressure may be applied over layer 7 to a desired pressure to engage layer 2 to such surface with more or less pressure. Then layer 7 is removed. Then layer 6 may receive and engage items such as fishing lures and a pair of earrings and hold such items until such items are removed. Before and after layer 7 is removed, the information or photograph or other printed matter on layer 3 is visible to the human eye. If desired, the holder may be removed from such surface and re-applied to another surface.

The fishing lure items shown in FIG. 1C may be made of a combination of metal and plastic. The necklace, earrings, and lipstick tube items shown in FIG. 1D may be made of stone, pearls, metal, plastic, or a rubber or rubber like material. These items and other items may be formed of metal, plastic, stone, pearls, rubber or rubber like material.

Other items that may be held by layers 2 or 6 include hoses such as oxygen hoses, cables such as cables with rubber or plastic coverings, wireless electronic sensors, wireless transmitters, wireless receivers, and one-piece wireless transmitters/receivers.

It should be noted that a hose such as an oxygen hose may run from an oxygen source to a patient, such that what is being held by the present holder is not the entire hose but a portion of the hose to relieve tension from the patient, such that the hose remains connected between the oxygen source and the patient. Thus the present holder need not support the weight of an entire item but may be helpful in that the present holder supports the weight of merely a portion of the item. For example, the proximal end of the stick of a broom, or canoe paddle, or fishing rod, or fishing net may be held by the present holder. Or the bottom end of the necklace shown in FIG. 1D may be resting on the top surface of a vanity. Or a kitchen utensil may be partially supported by the present holder and partially supported by a kitchen counter top. Or the present holder may be attached to a peg board to partially support hammers or other tools partially supported by the workbench or items partially supported by pegs in the peg board.

Further, with the holder having substrate layer 3, the substrate layer 3 may be related to what is being held. For example, the substrate layer 3 may contain written or pictorial instructions as to the item to be held and how such item relates to the patient or the device that the patient or caretaker may be using or operating. In the case of a fishing lure, the substrate layer 3 may contain written or pictorial illustrations that relate to how to tie the lure, how and where to use the lure, or to the type of fish that the lure may attract and catch.

FIG. 1D shows, attached to the front face (layer 6) of the holder, a necklace, a first pair of earrings, a second pair of earrings, and a lipstick tube. The holder of the present invention can be placed in a woman's dressing area, bathroom, bedroom, or car.

The dimensions of the present holder may be about four inches by about nine inches and about postcard or poster board thickness. The present holder may be sent through the mail (postal service). The present holder may be about four feet by about four feet and about poster board thickness. The length of the present holder may run from about a couple of inches to about ten feet. The height of the present holder may run from about a couple of inches to about ten feet. The thickness of the present holder may run from paper thin to poster board thickness to cardboard thickness.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A holder comprising:
   a) a release first layer;
   b) a pressure sensitive adhesive second layer, the pressure sensitive adhesive second layer being directly on the release first layer;
   c) a substrate third layer, the substrate third layer being directly on the pressure sensitive adhesive second layer;
   d) a laminating adhesive fourth layer, the laminating adhesive fourth layer being directly on the substrate third layer;
   e) a fifth layer formed of one of plastic or vinyl, the fifth layer being directly on the laminating adhesive fourth layer;
   f) a pressure sensitive adhesive sixth layer, the pressure sensitive adhesive sixth layer being directly on the fifth layer;
   g) a release seventh layer, the release seventh layer being directly on the pressure sensitive adhesive sixth layer; and
   h) wherein each of the fourth, fifth, sixth, and seventh layers is clear such that any information found on the third layer is visible to the human eye.

2. The holder of claim 1, wherein the substrate third layer is a photograph.

3. The holder of claim 1, wherein the substrate third layer includes an image.

4. The holder of claim 1, wherein the substrate third layer includes indicia.

5. The holder of claim 1, wherein the substrate third layer contains printed information.

6. The holder of claim 1, wherein the substrate third layer has at least one of a pictorial or written instruction relating to an item that may be held by one of the pressure sensitive adhesive second and sixth layers.

* * * * *